US009020132B2

(12) United States Patent
Thomson et al.

(10) Patent No.: US 9,020,132 B2
(45) Date of Patent: Apr. 28, 2015

(54) CONTACT CENTER AGENT FILTERING AND RELEVANCY RANKING

(75) Inventors: Rodney A. Thomson, Westminster, CO (US); Brian J. Reynolds, Erie, CO (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 13/419,088

(22) Filed: Mar. 13, 2012

(65) Prior Publication Data
US 2013/0243179 A1 Sep. 19, 2013

(51) Int. Cl.
*H04M 3/523* (2006.01)
*H04M 3/00* (2006.01)
*H04M 3/51* (2006.01)

(52) U.S. Cl.
CPC .............. *H04M 3/00* (2013.01); *H04M 3/5175* (2013.01)

(58) Field of Classification Search
CPC . H04M 3/5175; H04M 3/523; H04M 3/5232; H04M 3/5233; H04M 2203/402
USPC ............. 379/265.01, 265.02, 265.04–265.08, 379/265.11–265.14
See application file for complete search history.

(56) References Cited

U.S. PATENT DOCUMENTS

| 5,721,770 | A  | * | 2/1998  | Kohler .................... 379/265.12 |
| 6,636,598 | B1 | * | 10/2003 | Thomson et al. ........ 379/265.05 |
| 7,913,063 | B1 | * | 3/2011  | Lyerly .............................. 712/30 |
| 2010/0080378 | A1 | * | 4/2010 | Katz ....................... 379/265.14 |
| 2010/0086120 | A1 | * | 4/2010 | Brussat et al. ........... 379/265.12 |

OTHER PUBLICATIONS

Thomson et al., U.S. Appl. No. 13/348,408, Entitled "Apply Time for Temporary Administrative Changes", filed Jan. 11, 2012, 17 pages.
Thomson et al., U.S. Appl. No. 13/348,412, Entitled "Performance Center Mobile Supervisor Application", filed Jan. 11, 2012, 25 pages.

\* cited by examiner

*Primary Examiner* — Harry S Hong
(74) *Attorney, Agent, or Firm* — Sheridan Ross P.C.

(57) ABSTRACT

Methods and systems for supporting the monitoring and control of an automatic call distribution system are provided. In particular, a ranked list of candidate agents that can be assigned to handle contacts for a selected queue associated with an automatic call distribution system is presented to a supervisor. The supervisor can make agent assignments from the ranked list at the discretion of the supervisor. The assignment or reassignment can be effected by the supervisor through control inputs entered through the user interface. These control inputs can include reconfiguring agent and/or queue attributes. In addition, assignments can be effected through communications to agents made by the supervisor that are initiated through the user interface.

20 Claims, 6 Drawing Sheets

CONTACT CENTER AGENT FILTERING AND RELEVANCY RANKING

FIELD

The present invention is directed to contact center monitoring and control. More particularly, embodiments provide a ranked set of agents available for reallocation.

BACKGROUND

Contact centers, which typically are associated with human agents, are used to provide customer service and support. Increasingly, contact center operations have been automated. However, automated systems can make it difficult for supervisors to use their experience with contact center operations and with the skills of individual agents to assist queues that are in-trouble. In addition, previous tools available to supervisors for analyzing and controlling contact center operations have been difficult to use and usually do not clearly present information regarding relevant attributes of contact center agents.

In connection with the operation of call centers, it is desirable to minimize caller wait times. In order to maintain service requirements, for example to avoid wait times that are too long, systems have been developed that reallocate agents automatically. Automatic systems have been inflexible, in that they rely on accurate and complete information regarding agent qualifications and queue requirements in order to move agents between queues. In addition, systems that operate autonomously do not benefit from the intuition and experience of human supervisors. Automatic systems can also be difficult to control manually and/or can provide inadequate manual control options. Other systems allow a supervisor to manually administer assignments. However, even systems that support manual control have limitations with respect to changes that can be entered by a supervisor, and can suffer from inadequate reporting of information related to the relevant characteristics or attributes of contact center agents. Moreover, previous systems do not provide a means by which a supervisor can assess which agents are the best candidates to assist a queue or skill in-trouble so that the supervisor can make appropriate real time changes to agent assignments.

SUMMARY

Systems and methods that present a ranked list of agents are provided. More particularly, a supervisor or other user is provided with a ranked list or set of agents that potentially can be assigned to a selected queue. The agents are ranked according to a score assessing the suitability of the individual agents for assignment to the queue. In addition, embodiments of the present disclosure allow the user to control the assignment of individual agents to contact center queues.

Methods in accordance with embodiments of the present invention can include presenting a ranked list or set of agents. The ranking of the agents can be performed with respect to their suitability for assignment to a selected queue. The selected queue can be a queue that has been identified as a queue in-trouble, or that is otherwise not meeting or in danger of not meeting service level goals. More particularly, a score can be generated with respect to some or all of the agents associated with a contact center with respect to a selected queue. The scoring can consider various attributes of the agent or the current status of the agent, with respect to the queue. Such attributes can include the agents' skills, current status, scheduled log-in time, scheduled return time, and/or current assignment. The agents identified as being the best candidates for assisting the selected queue can be presented above other candidates in the ranked list. The agents in the ranked list can include agents already assigned to the selected queue, but who are not currently engaged in handling contacts, or who are engaged and nearing an average completion time. For example, agents in a wrap-up or auxiliary state can be included. As further examples, agents who are nearing the end of their shift and are about to log off can be excluded from the list.

In accordance with embodiments of the present disclosure, control input entered by a supervisor or other user can include changes to agent queue assignments. In accordance with further embodiments, control input can include sending communications from the supervisor to individual agents to request that the agents complete any auxiliary tasks that they are engaged in, or return from breaks, promptly. Accordingly, embodiments of the present disclosure present a supervisor with a useful list of agents who likely can be assigned to effectively assist an in-trouble queue, and that can accept input from the supervisor related to agent assignments.

Methods in accordance with embodiments of the present disclosure include selecting a first queue associated with the contact center, selecting first and second agents associated with the first contact center, and generating first and second agent scores for the first and second agents respectively. The agent scores are related to a suitability of the agents to support the first queue. A ranked list of candidate agents for assignment to the first queue that includes the first and second agents is reported. The method can additionally include receiving a control input from a user related to the ranked list of candidate agents that includes a selection of at least one of the agents from the ranked list of candidate agents and a command related to at least one of those agents. Selecting a first queue can include identifying that the first queue is in trouble. The first agent can be an agent that is currently assigned to the first queue. In addition, the first agent can be in an auxiliary state. The control input can include a selection of the first agent and the sending of the first message to the first agent regarding the first queue. The message can include a direction to the first agent to leave the auxiliary state and to assist with current work on the first queue. In accordance with further embodiments, the second agent can be an agent that is currently assigned to a second queue, and the control input can include a command that assigns the second agent to the first queue. The command assigning the second agent to the first queue can include a command to the second agent to handle contacts from the first queue. The command that assigns the second agent to the first queue can include enabling a disabled attribute associated with the second agent to allow that agent to handle contacts from the first queue. Absent the received control input an assignment of agents with respect to the first queue is not changed.

In accordance with further embodiments, a computer readable medium having stored thereon computer executable instructions causing a processor to execute a method for ranking candidate agents in a communication system that includes at least a first contact center is provided. The instructions include instructions to identify at least a first queue maintained with respect to the at least a first contact center. Instructions also rank the suitability of each of a plurality of agents for assignment to the at least a first queue, wherein the suitability of each agent in the plurality of agents is ranked relative to the other agents. The instructions further present the rank or suitability for at least some of the agents included in the plurality of agents to a user. Moreover, the instructions include instructions to receive control input from the user related to an assignment of at least one of the agents included in the plurality of agents. Control input received can include a modification to an agent allocation system. Alternatively or in addition, the control input can include an input to send a message to a first agent included in the plurality of agents. The computer readable medium can be included in a supervisor device, and the instructions can be executed by a processor included in that device. The instructions to identify at least a first queue can include identifying that the first queue is in trouble.

In accordance with further embodiments, an automatic call distribution (ACD) system is provided. The ACD system includes a plurality of agent workstations, wherein at least some of the workstations are associated with the human agent. An ACD server to which the plurality of agent workstations are interconnected is also provided. The ACD server includes a processor, memory, and application programming stored in the memory and executed by the processor. At least a first queue of contacts is established by the ACD server, and the application programming is operable to provide information regarding a status related to the first queue. The application programming is further operable to receive commands related to an assignment of human agents to the at least a first queue. A user interface running on at least one of the ACD server and an administrator device is provided, and is operable to present a relative ranking of at least some of the human agents with respect to suitability for assignment to the first queue, wherein the user interface is further operable to receive input including control signals related to the assignment of human agents to the first queue. The system can additionally include a supervisor device with a communication interface that interconnects the supervisor device to the ACD server. The supervisor device also includes a user output, user input, a processor, and memory. Application programming also included in the supervisor device is operable to present a relative ranking of at least some of the human agents with respect to suitability for assignment to the first queue through the user output. The user interface is further operable to receive input including control signals related to the assignment of human agents to the first queue through the user input. The input can include control signals to send a message to at least one of the human agents to handle at least a first contact from the first queue of contacts. The input can also include control signals to modify a parameter affecting an assignment of at least a first human agent to the first queue of contacts.

In accordance with further embodiments, a computer readable medium is described having stored thereon computer executable instructions, the computer executable instructions cause a processor to execute a method for ranking candidate agents in a communication system that includes at least a first contact center. The computer readable instructions comprise instructions to identify at least a first queue maintained with respect to at least the first contact center, instructions to rank a suitability of each of a plurality of agents for assignment to the at least a first queue, wherein the suitability of each agent in the plurality of agents is ranked relative to the other agents, instructions to present the ranked suitability for at least some of the agents included in the plurality of agents to a user, instructions to receive control input from the user related to an assignment of at least one of the agents included in the plurality of agents.

In another computer readable medium embodiment, the control input includes a modification to an agent allocation system.

In another computer readable medium embodiment, the control input includes input to send a message to a first agent included in the plurality of agents.

In another embodiment, the computer readable medium includes a supervisor device and the instructions are executed by a processor included in the supervisor device.

In another computer readable medium embodiment, the instructions to identify at least a first queue include identifying that the first queue is in-trouble.

Additional features and advantages of embodiments of the present invention will become more readily apparent from the following description, particularly when taken together with the accompanying drawings.

DETAILED DESCRIPTION

Figure 1:
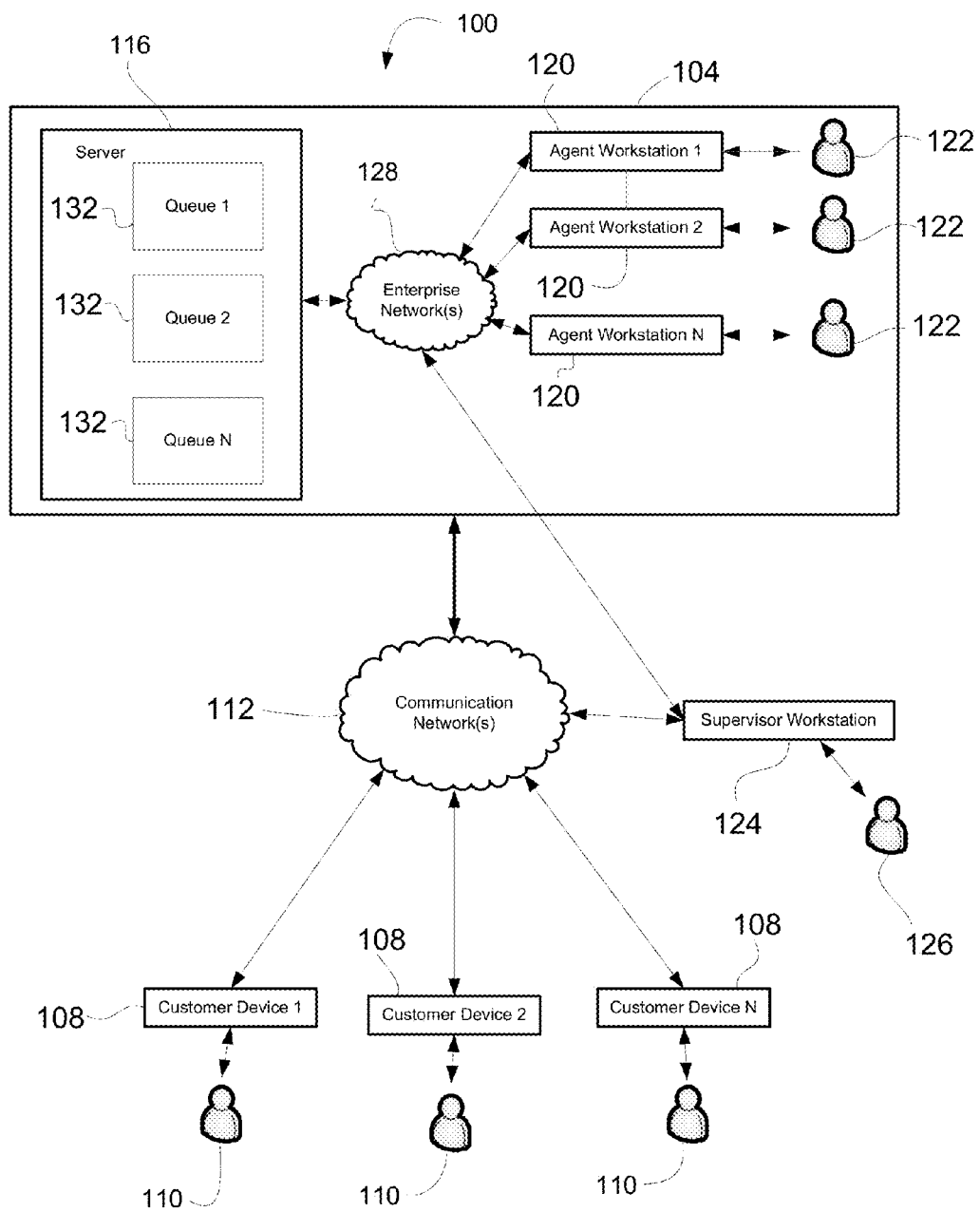
FIG. 1 is a block diagram depicting components of a system in accordance with embodiments of the present invention.

FIG. 1 is a block diagram depicting components of a communication system 100 in accordance with embodiments of the present invention. In particular, the communication system 100 includes a plurality of call or contact centers 104. Although a single contact center 104 is shown, a communication system 100 can have any number of contact centers 104. In general, the contact center 104 can be in communication with one or more customer endpoints or devices 108 via one or more communication networks 112. Examples of customer endpoints 108 include but are not limited to telephones, cellular telephones, and desktop or mobile computing devices, or any other device capable of supporting communications between a customer and a customer service or other agent associated with the contact center 104. Moreover, the communications between the contact center 104 and the customer endpoints 108 can comprise voice telephony, video telephony, email, instant messaging, short message system, or other real time or non-real time communications. The communication network 112 can include the Internet, local area network, wide area network, public switched telephony network (PSTN), wireless networks, or a plurality of networks in any combination. The contact center 104 generally includes a call or contact center server 116, such as an automatic contact (or call) distribution system (ACD) server 116. The ACD server 116 is illustratively the Avaya Aura® Call Center Elite enterprise communication-based ACD system. The ACD server 116 is interconnected to a plurality of agent workstations or endpoints 120. The agent workstations 120 may be connected to the ACD server 116 by a voice and/or data transmission median or enterprise network 128.

The ACD server 116 generally functions to connect agent workstations 120 to customer devices or endpoints 108 through the communication network 112, to place customers 110 in communication with agents 122. In addition, the ACD server 116 maintains queues 132 for servicing customer calls or other contacts. The different queues 132 can be used to sort contacts from (or to) customer endpoints 108 by type, identity of the customer 110 or contact, or any other attribute. Agents 122 associated with the agent workstations 120 are assigned to provide services to contacts that have been placed within one or more of the queues 132 based on availability and/or weighting factors.

In addition, embodiments of a communication system 100 can include a supervisor or administrator device 124. The supervisor device 124 is in communication with the ACD server 116 via the communication network 112 and/or the enterprise network 128. For example, if the supervisor device 124 is on the premises of the contact center 104, communications with the ACD server 116 may be over a portion of the enterprise network 128 comprising a wired or a wireless (e.g., a Wi-Fi) network. As another example, the supervisor device 124 may be in communication with the ACD server 116 over the communication network 112, for example via a cellular telephony data network, a Wi-Fi or a wired Ethernet connection outside of the enterprise network 128. In general, the supervisor device 124 provides functionality that allows a supervisor or other user 126 to monitor the health of the contact center 104, and to control aspects of the operation of the contact center 104.

The supervisor device 124 can comprise any device, including a mobile device, capable of presenting information to a supervisor 126, and of receiving control commands from the supervisor 126. In addition, the supervisor mobile device 124 is generally a device capable of running an application that provides a browser, template or framework for displaying information and receiving input with respect to such information. In addition, the supervisor device 124 is a device that is capable of wireless communications over at least one of a variety of wireless network types, including but not limited to cellular data networks (such as 3G or 4G networks), Wi-Fi networks, WiMax networks, Bluetooth connections, Ethernet networks, and the like. Accordingly, a supervisor device 124 can include, but is not limited to, a tablet computer, a laptop computer, a Smartphone, a Netbook, a desktop computer, or the like.

Figure 2A:
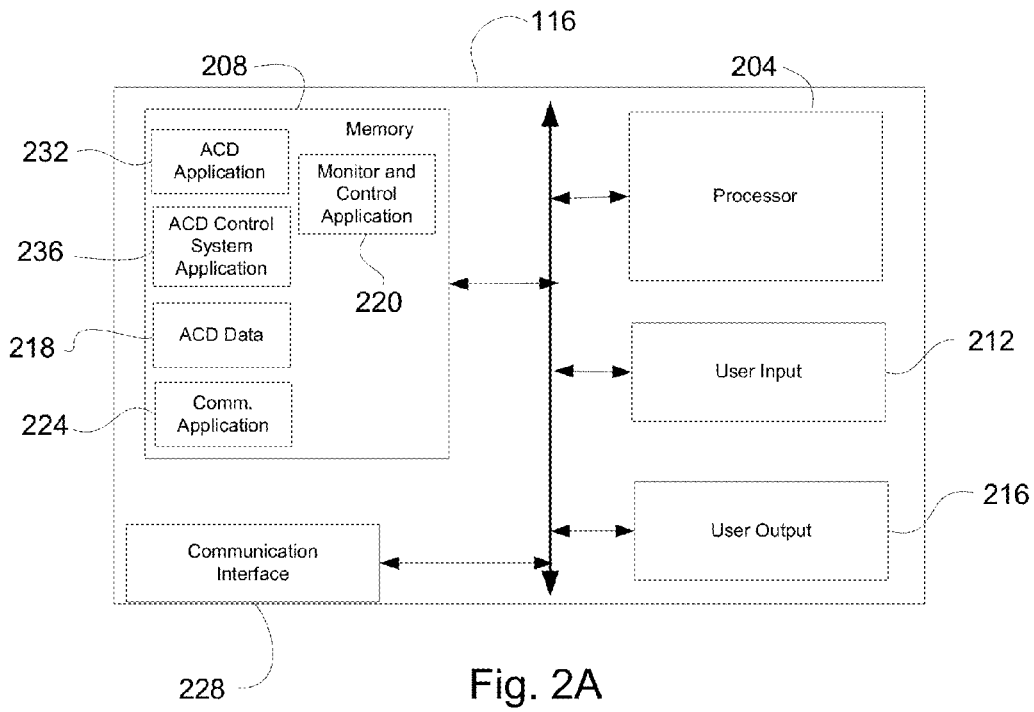
FIGS. 2A-2B are block diagrams of a contact center server and a supervisor device respectively in accordance with embodiments of the present invention.
Figure 2B:
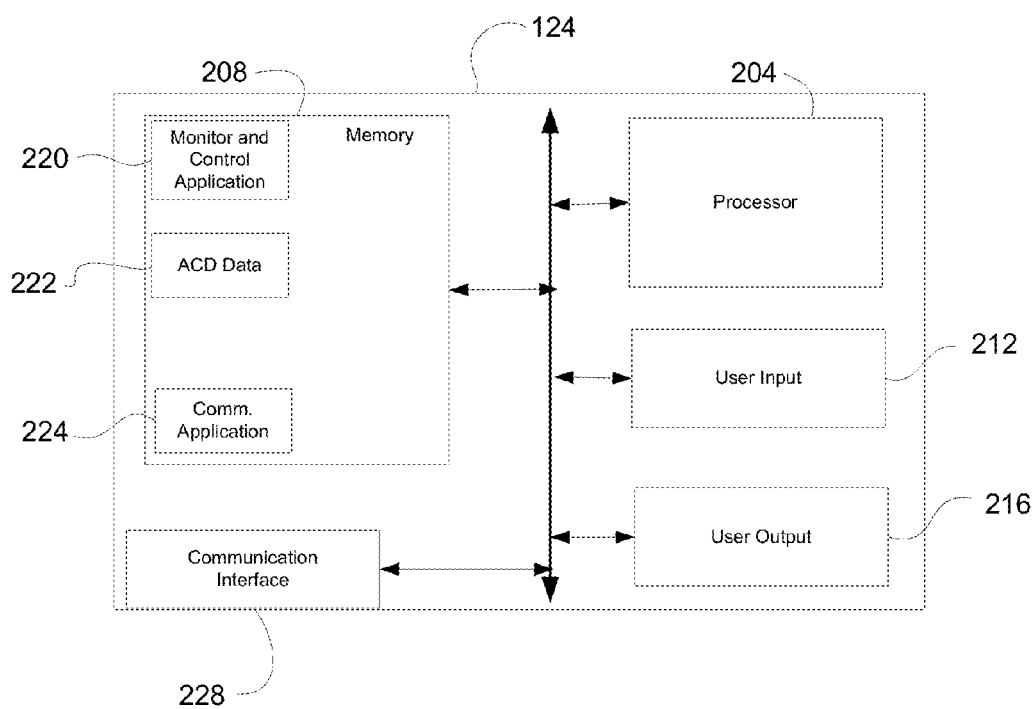

FIGS. 2A-2B are block diagrams depicting components of an ACD system 104 in accordance with embodiments of the present invention. More particularly, components of an ACD server 116 are shown in FIG. 2A, while components of a supervisor device 124 are shown in FIG. 2B.

As the ACD server 116 and the supervisor device 124 can, at least partially, be implemented as conventional computing devices, they share certain components in common. For example, each generally includes a processor 204 capable of executing program instructions. The processor 204 may include any general purpose programmable processor or controller for executing application programming. Alternatively, the processor 204 may comprise a specially configured application specific integrated circuit (ASIC). The processor 204 generally functions to run programming code implementing various functions performed by the associated ACD server 116 or supervisor device 124. For example, with respect to the ACD server 116 (see FIG. 2A), the processor 204 can implement functions including assigning incoming contacts received by the contact center 104 from customer endpoints 108 to contact queues 132 and to agent workstations 120 for handling by associated agents 122. As another example, with respect to the supervisor device 124 (see FIG. 2B), such functions may include displaying information regarding the operation of the communication system 100 and/or an included call center 104 to the supervisor 126, and to receiving commands input by the supervisor 126 with respect to the operation of a contact center 104. Moreover, as described in greater detail elsewhere herein, the ACD server 116 and the supervisor device 124 operate in cooperation with one another to provide monitoring and control functions to a supervisor 126, to assist in the operation of the contact center 104.

The ACD server 116 and the supervisor device 124 additionally include memory 208. The memory 208 can be used in connection with the execution of programming by the processor 204 of the associated device 116 or 124, and for the temporary or long term storage of data or program instructions. For example, the ACD server 116, as shown in FIG. 2A, can include a monitor and control application 220 and/or an automatic call distribution application 232 that is stored in memory 208. As an additional example, the ACD server 116 can operate in connection with the operation of an ACD control system application 236 stored in the memory 208 that functions as an adjunct to or in cooperation with the ACD call distribution application 232. The memory 208 of the ACD server 116 can also function as a store for records or other data 218 that is related to the ACD or contact queues 132 maintained by the ACD server 116. The memory 208 included in the supervisor device 124, as shown in FIG. 2B, can include a monitor and control application 220. As described in greater detail elsewhere herein, the monitor and control application 220, whether implemented on one or both of an ACD server 116 or a supervisor device 124, can provide a user interface to display information regarding the operation of the ACD system 104 to the supervisor 126 or other user, and to receive control input from the supervisor 126 or other user. The memory 208 in the supervisor device 124 can also provide storage for ACD system 104 data 222. The memory 208 of the ACD server 116 and/or the supervisor mobile device 124 can additionally provide storage for one or more communication applications 224. Examples of communication applications 224 include, but are not limited to, email, instant messaging, voice telephony, video telephony, and the like. The memory 208 of the ACD server 116 and/or the supervisor mobile device 124 can include solid state memory that is resident, removable and/or remote in nature, such as DRAM and SDRAM. Alternatively or in addition, the memory 208 can include magnetic, optical or other storage devices. Moreover, the memory can include a plurality of discrete components of different types and/or a plurality of logical partitions.

In addition, user input devices 212 and user output devices 216 may be provided. With respect to the ACD server 116, such devices 212 and 216 can be used in connection with the monitoring and control of the ACD system 104 by a supervisor 126 or an administrator in a conventional fashion, in which the supervisor 126 or administrator is tethered to the contact center 104. With respect to the supervisor device 124, the one or more user input devices 212 or one or more user output devices 216 facilitate the remote monitoring and control of the ACD system 104 by the supervisor 126 through the supervisor device 124. Examples of user input devices 212 include a keyboard, a numeric keypad, touch screen, microphone, scanner, and pointing device combined with a screen or other position encoder. Examples of user output devices 216 include a display, a touch screen display, a speaker, and a printer. As can be appreciated by one of skill in the art, a touch screen display may comprise a combined user input 212 and user output 216 device. The ACD server 116 and the supervisor mobile device 126 also generally include a communication interface 228 to interconnect the server 116 or device 126 to the networks 112 and 128.

Figure 3A:
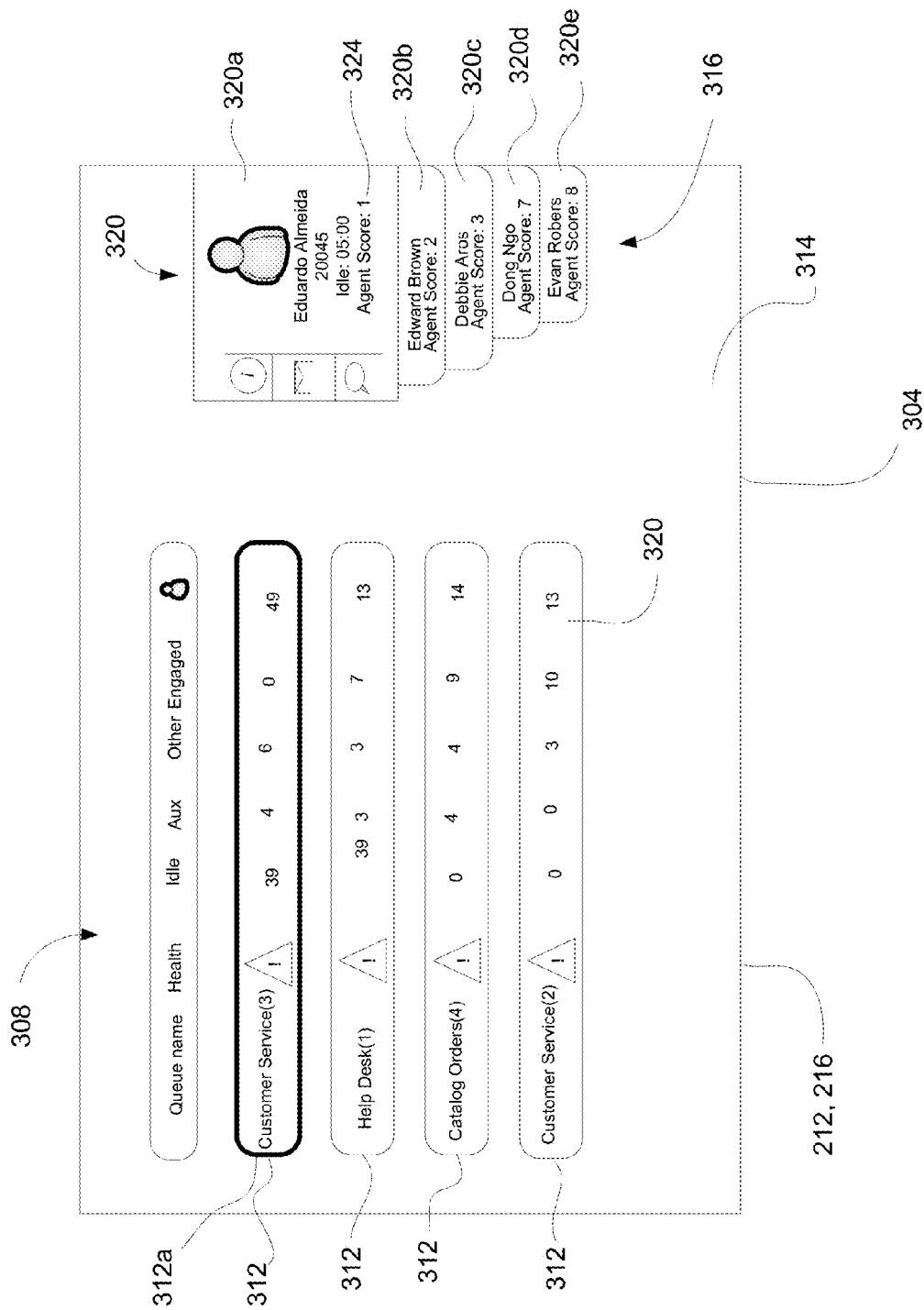
FIGS. 3A-C depict a user interface in accordance with embodiments of the present invention.
Figure 3B:
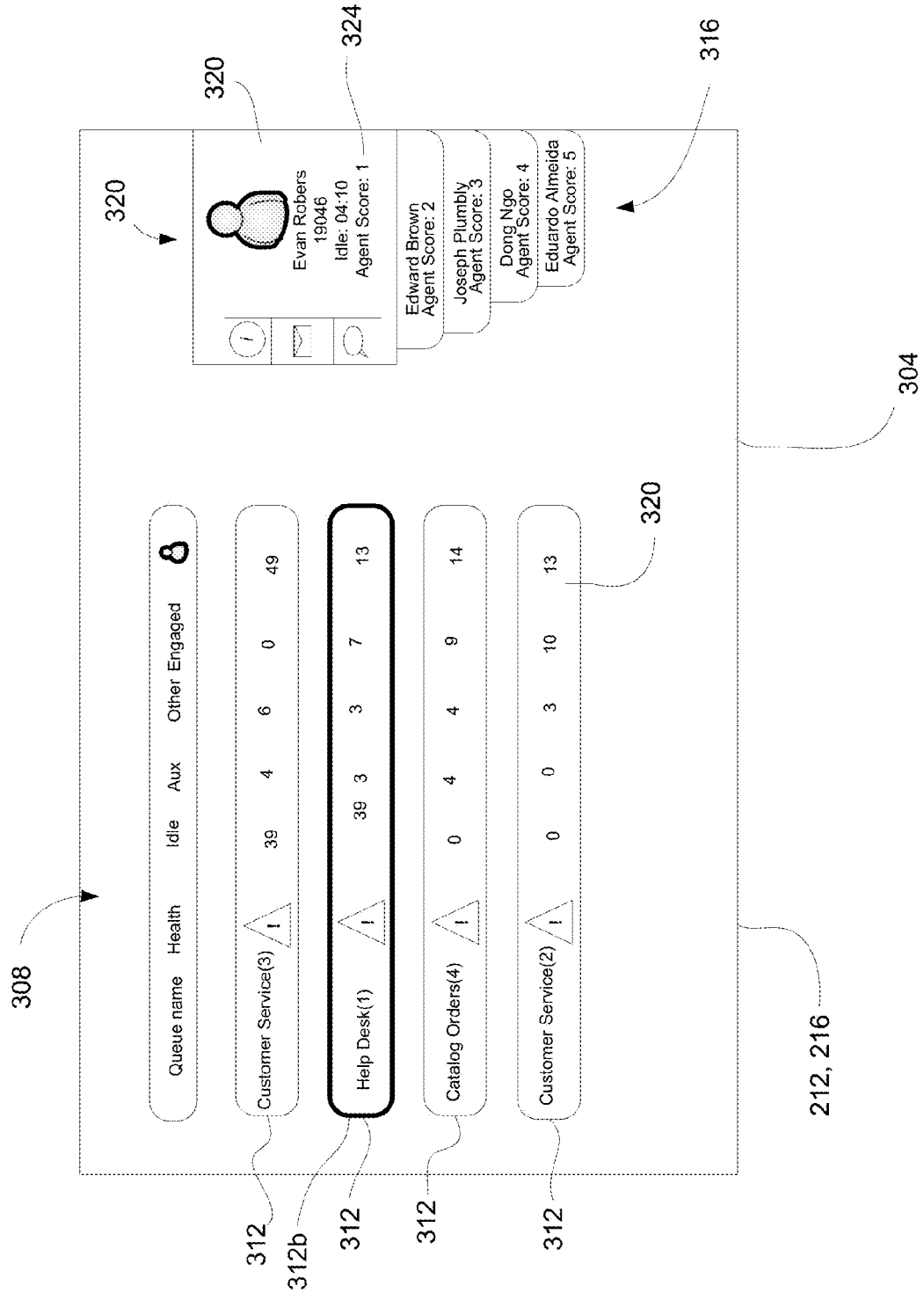
Figure 3C:
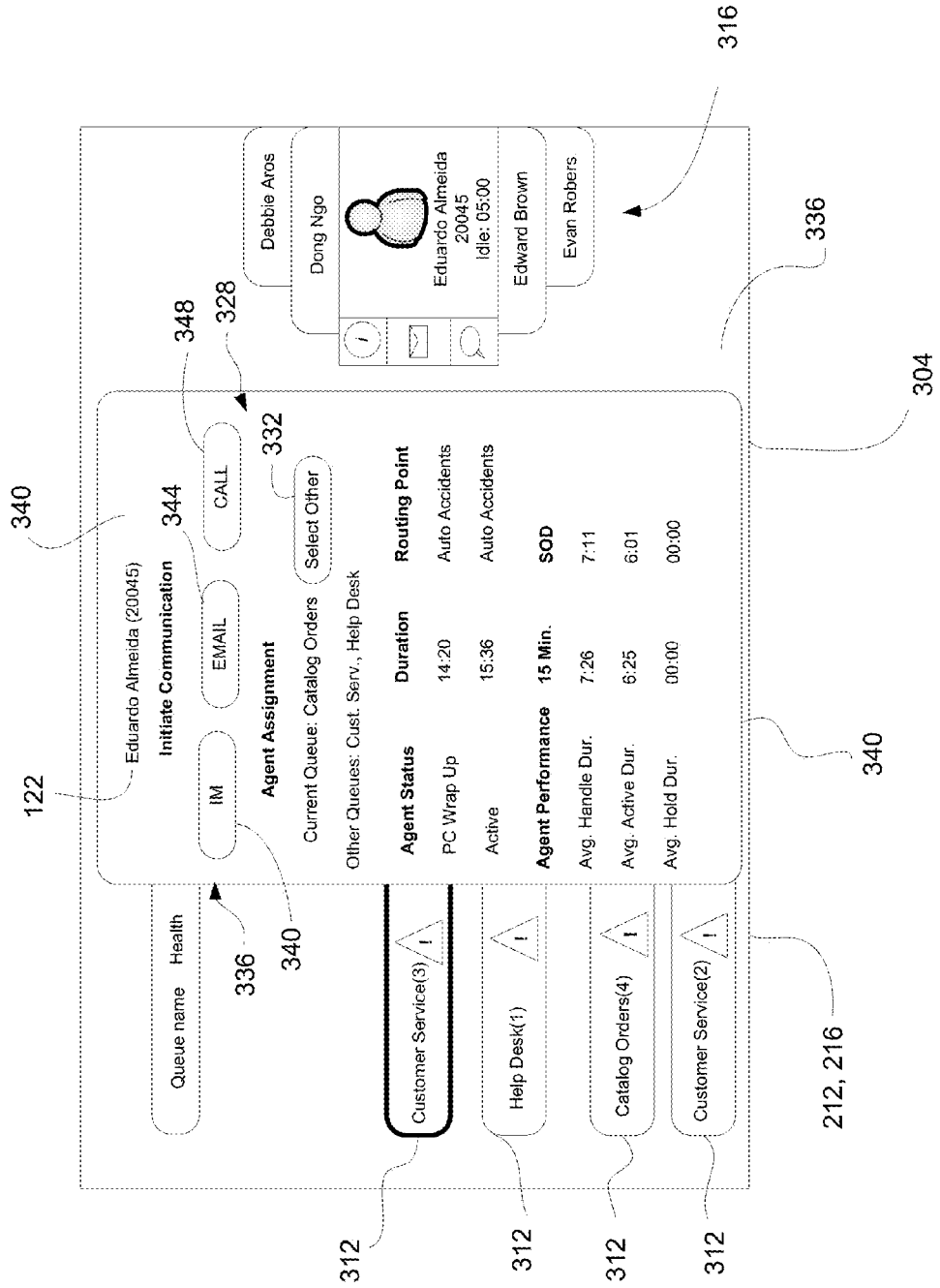

FIG. 3A-C depict different exemplary pages or screens that can be presented to a supervisor 126 or other user by a user interface 304 in accordance with embodiments of the present invention. The user interface 304 can be generated through operation of the ACD control system application 236 on one or a plurality of contact center servers 116 within the communication system 100, and/or in connection with a monitor and control application 220 running on an ACD server 116 and on a supervisor device 124, in response to data and contact center 104 control features provided by or associated with the ACD application 232 and/or ACD data 218 on the ACD server 116. The user interface 304 can be presented by a user output 216 of a contact center server 116 and/or a supervisor device 124. Moreover, the user interface 304 can be interactive, in that it can provide fields, regions, buttons, menus, or other features to enable the user interface to receive input from a supervisor or administrator 126, as well as to present information to the supervisor 126 graphically.

More particularly, FIG. 3A depicts a user interface 304 that presents queue status display information 308, with lines of data or queue information 312 that each display health information concerning a number of queues 132. The user interface 304 can, for example and without limitation, comprise a touch screen display 212, 216. The user interface 304 also presents a ranked set or stack of agents 316 generated in connection with a selected set of queue information 312a. The ranked set of agents 316 includes selectable tiles 320 depicting information regarding individual agents 122. As shown, a selected and/or top tile 320a may present more information than is presented by other tiles 320b-e included in the ranked set of agents 316. The depicted information includes an agent score or ranking 324. As described in greater detail elsewhere herein, the agent score 324 is generated by operation of the system, for example through execution of the ACD control system application 236 and/or the monitor and control application 220 concerning the suitability of the individual agents 122 associated with the contact center 104 with respect to the queue 132 corresponding to the selected set of queue information 312a. Accordingly, embodiments of the disclosed invention filter or sort candidate agents 122 in an ordered list or set 316. As shown, a first tile 320a contains information related to an agent 110 having the highest score 324 from those included in the set 316. By selecting other tiles 320 within the list 316, a supervisor 126 can access detailed information for any of the disclosed agents. Moreover, where the list 316 is long, the supervisor 126 can scroll the list, for example up or down, to view summary information, such as the name and rank, of the candidate agents in the list 316, search the list 316, or use a rolodex index to find a particular agent.

With reference now to FIG. 3B, the user interface 304 is shown in an altered configuration. More particularly, the supervisor 126 has selected a second set of queue information 312b. This results in the presentation of a different list of agents 316 as candidate agents. More particularly, the ACD control system application 236 and/or the monitor and control application 220 has presented a list of agents 316 with scores 324 generated for the included agents 122 with respect to the second queue 132, corresponding to the second selected set of queue information 312b. The different requirements associated with the second queue 132 as compared to the first queue 132 results in different rankings 324 for at least some of the agents 122 associated with the call center 104. Moreover, the generation of different rankings can further result in different agents 122 being included in the displayed list or set 316. Again, the operation of the ACD control system application 236 and/or monitor and control application 220 therefore presents a filtered list of candidate agents 122, to assist the supervisor 126 in selecting agents 122 that can be reassigned, to assist a queue 132 that is in trouble or that otherwise requires additional assistance.

FIG. 3C depicts the user interface 304 presenting an exemplary view after an agent tile 320 included in the list 316 has been selected. In this example, selectable items 328 are included that allow the supervisor 126 to enter control input. In this example, the selectable items 328 include configurable agent assignment attributes 332 and communication initiation options 336 with respect to an individual agent. Alternatively, a group including a plurality of agents 122 could be selected from the list, and a selectable item 328 can be used by the supervisor 126 to enter a new assignment or communicate with all of the agents 122 within the group simultaneously. By selecting an agent assignment attribute 332, the supervisor 126 can affect the current status and/or queue 132 assignment for the selected agent 122. For example, the supervisor 126 can enter changes that alter the current queue assignment of the selected agent 122. By selecting a communication initiation option 332, the supervisor 126 can initiate a communication directed to the selected agent 122. For example, the supervisor 126 can choose to send an email 340, IM message 344, or to initiate a voice call 348 with the selected agent 122. Accordingly, manual control of contact center 104 agent 122 and queue 132 parameters can be manually reconfigured by the supervisor 126. Moreover, the supervisor 126 can, through the selection of a communication initiation 332 option, provide instructions to a selected agent 122 to direct the agent's behavior. As examples, and without limitation, a supervisor 126 can choose to send an instant message (IM), an email, or initiate a voice call.

Figure 4:
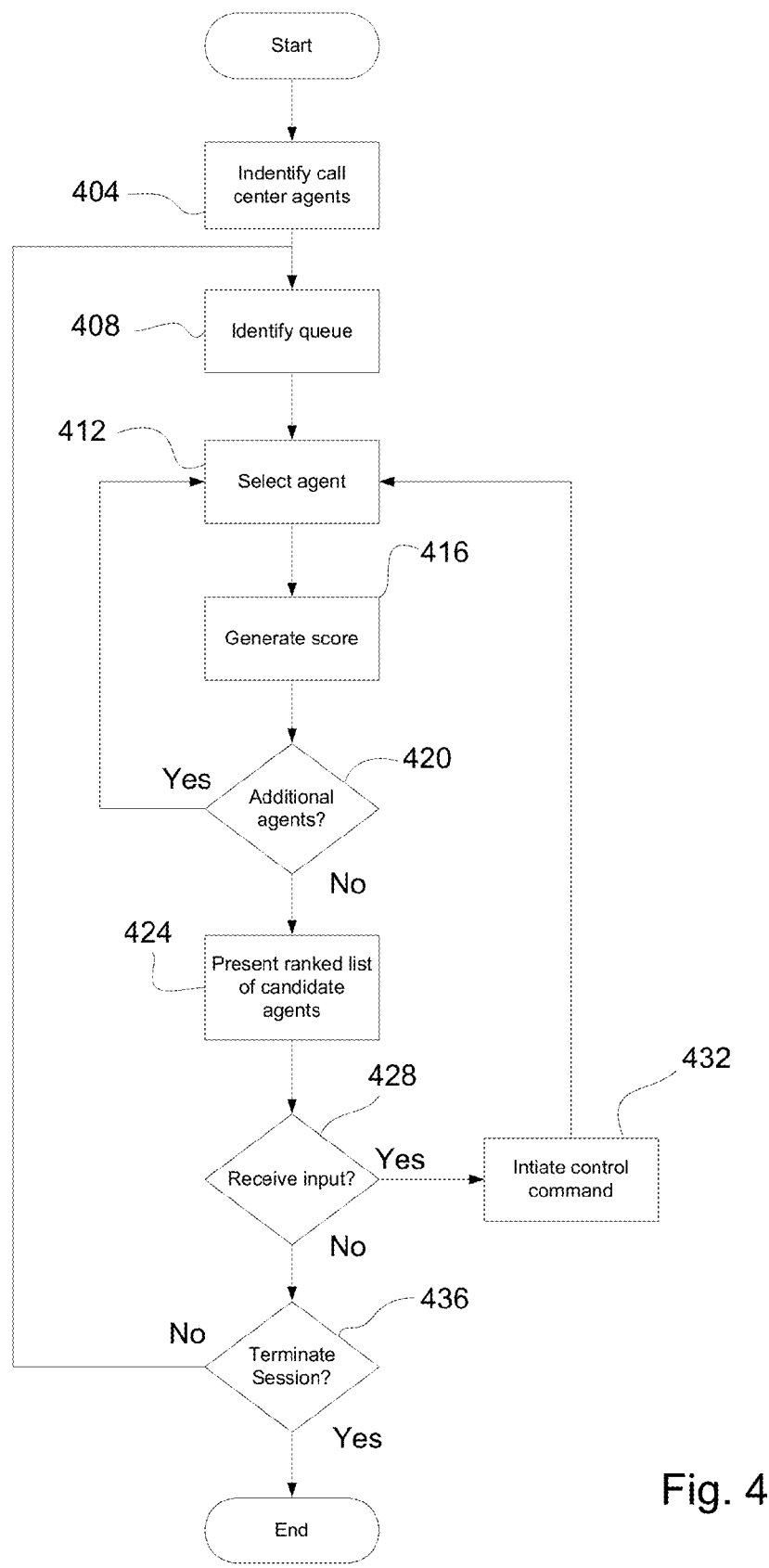
FIG. 4 is a flowchart depicting aspects of a method in accordance with embodiments of the present invention.

With reference now to FIG. 4, aspects of a method for performing filtering and relevancy ranking of contact center agents 122 with respect to contact center 104 queues 132 are depicted. Initially, at step 404, contact center agents 122 are identified. The identification of contact center agents 122 can include identifying agents 122 then available to the contact center 104. The available agents 122 can include agents that are assigned to any queue 132 established in connection with the contact center 104, or who are otherwise in an active or auxiliary duty status. Moreover, the identification of contact center agents 122 can include identifying agents 122 who are scheduled to be on duty or otherwise available for work in the near future, for example within a predetermined time frame.

At step 408, a queue 132 that is in trouble or that otherwise requires or could benefit from supervisor 126 intervention with respect to agent 122 assignments is identified. The identification of a queue 132 that is in trouble can be performed using automated and/or manual means. For example, a supervisor 126 can, accessing information displayed as part of the user interface 304, select a set of queue information 312 associated with a queue 132 that has been identified by the ACD control system application 236 and/or the monitor and control application 220 as being in trouble. Such automated identification can include identifying a queue 132 that is not meeting minimum service requirements, or that is not meeting optimal service levels. The supervisor 126 can additionally select a queue 132 that the supervisor recognizes as having a deteriorating health status, either through observation of displayed information 312, or through the flagging of a deteriorating condition through the operation of the ACD control system application 236 and/or the monitor and control application 220. In at least one mode of operation, an initial selection of a queue 132 can be performed automatically, while a revised selection can be made by the supervisor 126, for example by selecting queue information 312 associated with a queue 132 through the user interface 304.

At step 412, an agent 122 from the set of contact center 104 agents 122 is selected for scoring. An agent score 324 is then generated for the identified agent 122 with respect to the selected queue 132 (step 416). More particularly, the ACD control system application 236 and/or the monitor and control application 220 operates to generate a score 324 that assesses the suitability of the individual agent 122 for assignment to the selected queue 132. In generating the score 324, various agent 122 and queue 132 attributes can be considered. For example, whether the individual agent 122 is currently assigned to the queue, whether the agent is engaged in actively handling a contact, whether the agent is in a wrap-up state, whether the agent is in an auxiliary state at their workstation 120, whether the agent is in an auxiliary state but not at their workstation 120. Where the agent 122 is in an auxiliary state, whether the auxiliary state is one that can be interrupted is considered. Alternatively or in addition, when the agent is an auxiliary state, the time at which the agent is scheduled to return can be considered. In connection with agents 122 in an auxiliary state, the ranking algorithm can associate a higher rank with otherwise equally ranked agents for agents in an interruptible auxiliary state, such as an agent on a break at their workstation 120. In connection with agents 122 in an auxiliary state or who are logged out, the ranking can consider the agents' 122 historical timeliness. For instance, agents who are more likely to adhere to their assigned schedules can be ranked more highly than other agents, since such agents are more likely to be available when scheduled. Other possible criteria include whether a particular agent 122 is qualified to assist the selected queue 132, whether the agent 122 has attributes disabled that would be qualified to assist the selected queue 132 if such attributes were re-enabled, and the agents' 122 current workload. When the agent 122 is in a wrap-up state, the ranking or agent score 324 associated with the agents 122 can account for the amount of time elapsed since the agent entered the current wrap-up state, for agents 122 in a wrap-up state, to assist the supervisor 126 in identifying an agent 122 that is close to or that should be close to finishing wrap-up procedures. Moreover, the various possible agent states and/or attributes can be weighted differently with respect to one another, to arrive at the agent ranking 324.

At step 420, a determination may be made as to whether additional agents 122 require scoring. If additional agents 122 remain to be scored, the process can return to step 412, and a next agent 122 can be selected from the set of contact center 104 agents 122, and a score generated for that selected agent 122 with respect to the selected queue 132.

At step 424, after all or some minimum number of agents 122 associated with the contact center 104 have been scored, the ranked list of agents is presented. This can include presenting the ranked list 316 as part of the user interface 304 display. In general, the list 316 is ordered according to the score 324 that was generated for the individual agents 122 with respect to the selected queue 132. In accordance with embodiments of the present disclosure, the list 316 can be filtered. For example, only those agents 122 that are associated with a predetermined minimum agent score 324 may be included in the list 316. Alternatively or in addition, agents 122 that do not have certain minimum qualifications with respect to the selected queue 132 can be omitted from the list 316. Furthermore, the list 316 can present a limited set of agents 122 at any particular time. For example, a certain maximum number of tiles 320 may be presented simultaneously by the user interface 304. Where a certain maximum number of tiles 320 are presented at any one time, a supervisor 126 can access information related to additional agents 122 included in the list 316 by scrolling through the list 316.

At step 428, a determination can be made as to whether control input has been received. Control input can include the selection of a particular agent tile 320 by the supervisor 126, and the further selection of a configurable agent assignment attribute 332, other action with respect to information included in the selected tile 320, or an input selecting the initiation of a communication 336. If control input has been received, the control command can be initiated with respect to the system 100 (step 432). Where the supervisor 126 chooses to initiate a communication, examples of control input include sending the candidate agent 122 a message to finish wrap-up work and handle more contacts for the selected queue 132. As a further example, a message can be sent to an agent 122 in an auxiliary state to notify the agent 123 to leave the auxiliary state and to start handling contacts associated with the selected queue 132. As yet another example, an agent 122 in an auxiliary state who is scheduled to return within a predetermined time frame can be reminded or encouraged through a communication from the supervisor 126 to return from the auxiliary state in a timely fashion, and to be ready to accept contacts from the selected queue 132 immediately upon their return from the auxiliary state. Similarly, agents 122 who are logged out but who are scheduled to log-in within a predetermined time frame can be reminded through a communication to log-in in a timely manner, and to be ready to accept contacts associated with the selected queue 132 immediately upon their return. Agents working on contacts associated with other queues 132 can be assigned to the selected queue 132 through input entered by the supervisor 126. For example, a supervisor 126 can configure an agent attribute 332 to assign the agent 122 to an in trouble queue 132, and/or can choose to send a communication 336 to instruct the agent 122 to assist the in trouble queue 132.

At step 436, a determination can be made as to whether operation of a process of ranking agents 122 with respect to a queue 132 should continue. If operation is to continue, the process can return to step 308, where a supervisor 126 can select a queue 132 for which a ranked list of agents 316 is desired. If operation of the process is to be discontinued, that process can end.

Embodiments of the disclosed invention provide a ranked or ordered list 316, in which the top candidate agents 122 are at the top of the list 316, while the bottom candidate agents 122 are at the bottom of that list 316. Within a list 316, the agents 122 may be grouped by desired actions, such as sending an IM or email, and agents who can be assigned to the selected queue 132 through explicitly manipulating the agent 122 assignments. In addition, the information presented can allow a supervisor 126 to consider whether it is better to wait for agents 122 to return from breaks or to pull in agents who are under normal circumstances not eligible for assignment to the selected queue 132 because they are less qualified. In addition, consideration can be made as to whether moving an agent 122 to the selected queue 132 from another queue 132 will hurt that other queue 132.

In contrast to previously solutions, which relied solely on the knowledge and experience of the supervisor 126 in reconfiguring agent 122 assignments with respect to in trouble queues 132, such that a substitute or otherwise inexperienced supervisor 126 might not have the knowledge required to make appropriate choices, embodiments of the present invention provide a ranking of candidate agents 122 that can be added to a queue 132 that represent appropriate choices. Moreover, even for an inexperienced supervisor 126, embodiments of the present disclosure provide an appropriate starting point that the supervisor 126 can modify as deemed necessary, to make appropriate assignments. Accordingly, embodiments of the present disclosure avoid the situation presented by completely automated contact centers 104, in which manual intervention 126 is impossible or difficult to provide. Accordingly, a supervisor 126 is allowed to choose the agents 122 that are assigned to a selected queue 132, while providing the supervisor 126 with a means to identify the best candidate agents 122 for assisting the selected queue 132. Moreover, the supervisor 126 is not required to rely solely on their knowledge of the candidate agents 122, or to evaluate statistical information in order to determine the best candidate agents 122 based on current queue 132 assignments, the current state of individual agents 122, and the like. Moreover, embodiments of the present invention allow a supervisor 126 to maintain control of the contact center 104, by providing the supervisor 126 with the information needed to make an informed decision, through the use of scoring agents 122 for the best match for assisting the selected queue 132.

As described herein, a supervisor 126 or other user can interact with a user interface 304 to access the ranked list of candidate agents 122, and to allocate agents 122 to a selected queue 132. Such interaction can be through a supervisor device 124 and/or a contact center server 116. Moreover, the presentation of the user interface 304 can be in connection with the collection of ACD data 218 by an ACD application 232, in cooperation with an ACD control system application 236 running on an ACD server 116. Moreover, the presentation of the user interface 304 can be made using such information by the monitor and control application 220 running on the contact center server 116, and associated contact server 116, and/or a supervisor device 124. In accordance with further embodiments, the supervisor device 124 can include a desktop computer, or a mobile device, including but not limited to a laptop computer, a tablet computer, or a smart phone. As exemplary embodiments, the ACD system 104 may comprise an Avaya MultiVantage ACD system, while the supervisor 124 can comprise an Apple iPad running a monitor and control application 220 comprising an app provided by Avaya Inc.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A method, comprising:
    receiving, from a supervisor device, a selection, by a user, of a first queue associated with a first contact center;
    selecting, by an automatic call distribution server, a first agent associated with the first contact center;
    generating, by the automatic call distribution server, a first agent score, wherein the first agent score is related to a suitability of the first agent to support the first queue;
    selecting, by the automatic call distribution server, a second agent associated with the first contact center;
    generating, by the automatic call distribution server, a second agent score, wherein the second agent score is related to a suitability of the second agent to support the first queue;
    reporting, by the automatic call distribution server, to the user at the supervisor device, a ranked list of candidate agents for assignment to the first queue, wherein the ranked list includes the first and second agents;
    receiving a control input from the user, at the supervisor device, related to the ranked list of candidate agents, wherein the control input includes a selection of at least one of the first and second agents from the ranked list of candidate agents and a command related to the selected at least one of the first and second agents; and
    in response to receiving the command related to the selected at least one of the first and second agents, the automatic call distribution server connecting a voice call or data transmission medium in the first queue to one of the selected at least one of the first and second agents.

2. The method of claim 1, wherein selecting the first queue includes identifying that the first queue is in-trouble.

3. The method of claim 2, wherein the first agent is an agent currently assigned to the first queue.

4. The method of claim 3, wherein the first agent is currently in an auxiliary state.

5. The method of claim 4, wherein the control input includes a selection of the first agent and sending a first message to the first agent regarding the first queue.

6. The method of claim 5, wherein the first message includes a direction to the first agent to leave the auxiliary state and to assist with current work on the first queue.

7. The method of claim 1, wherein the second agent is an agent currently assigned to a second queue, and wherein the control input includes a command that assigns the second agent to the first queue.

8. The method of claim 7, wherein the command that assigns the second agent to the first queue includes a command to the second agent to handle contacts from the first queue.

9. The method of claim 7, wherein the command that assigns the second agent to the first queue includes enabling at least a first disabled attribute associated with the second agent to allow the agent to handle contacts from the first queue.

10. The method of claim 1, wherein absent the received control input, an assignment of agents with respect to the first queue is not changed.

11. A non-transitory computer readable medium having stored thereon computer executable instructions, the computer executable instructions causing a processor to execute a method for ranking candidate agents in a communication system that includes at least a first contact center, the computer readable instructions comprising:
    instructions to identify, by an automatic call distribution server, based on a received first control input from a user at a supervisor device, at least a first queue maintained with respect to at least the first contact center;
    instructions to rank, by the automatic call distribution server, a suitability of each of a plurality of agents for assignment to the at least a first queue, wherein the suitability of each agent in the plurality of agents is ranked relative to the other agents;
    instructions to present, by the automatic call distribution server, the ranked suitability for at least some of the agents included in the plurality of agents to the user at the supervisor device;
    instructions to receive, by the automatic call distribution server, a second control input from the user, at the supervisor device, related to an assignment of at least one of the plurality of ranked agents; and
    instructions to connect, by the automatic call distribution server, a voice call or data transmission medium in the first queue to one of the at least one of the plurality of ranked agents in response to receiving the second control input related to the assignment of the at least one of the plurality of ranked agents.

12. The computer readable medium of claim 11, wherein the first control input includes a modification of an agent allocation system.

13. The computer readable medium of claim 11, wherein the second control input includes input to send a message to a first agent included in the plurality of ranked agents.

14. The computer readable medium of claim 11, wherein the computer readable medium is included in the supervisor device, and wherein the instructions are executed by a processor included in the supervisor device.

15. The computer readable medium of claim 13, wherein the instructions to identify the at least the first queue include identifying that the at least first queue is in-trouble.

16. An automatic call distribution (ACD) system, comprising:
a plurality of agent workstations, wherein at least some of the workstations are associated with a human agent;
an ACD server, wherein the plurality of agent workstations are interconnected to the ACD server, the ACD server including:
a processor;
memory;
application programming stored in the memory and executed by the processor, wherein at least a first queue of contacts is established by the ACD server, wherein the application programming is operable to provide information regarding a status related to the at least a first queue of contacts, and wherein the application programming is operable to receive commands related to an assignment of human agents to the at least a first queue of contacts; and
a user interface running on the ACD server, wherein the user interface is operable to present, to a user, a relative ranking of at least some of the human agents with respect to suitability for assignment with the at least a first queue of contacts, wherein the user interface is further operable to receive input, from the user, including control signals related to the assignment of the human agents to the at least a first queue of contacts, wherein a control input is received from the user, at the supervisor device, related to the ranking of the at least some of the human agents, wherein the control input includes a selection of at least some of the human agents in the ranking and a command related to the selected at the least some of the human agents in the ranking, and in response to receiving the command related to the selected at least some of the human agents in the ranking, the application programming connecting a voice call or data transmission medium in the at least a first queue of contacts to one of the selected at least some of the human agents in the ranking.

17. The system of claim 16, further comprising:
the supervisor device, including:
a communication interface, wherein the communication interface interconnects the supervisor device to the ACD server;
a user output;
a user input;
a processor;
memory; and
application programming, wherein the application programming is operable to present a relative ranking of at least some of the human agents with respect to suitability for assignment with the at least a first queue of contacts through the user output, and wherein the user interface is further operable to receive input including control signals related to the assignment of the human agents to the at least a first queue of contacts through the user input.

18. The system of claim 17, wherein the input includes control signals to send a message to at least one of the human agents to handle at least a first contact from the at least a first queue of contacts.

19. The system of claim 17, wherein the input includes control signals to modify a parameter affecting an assignment of at least a first human agent to the at least a first queue of contacts.

20. The system of claim 16, wherein the status related to the at least a first queue of contacts is that the at least a first queue of contacts is in-trouble.

* * * * *